CIRCUIT FOR SYNCHRONIZING THE ROTARY POSITION OF TRANSDUCER HEADS ON A MAGNETIC TAPE PLAYER

Filed Oct. 27, 1966

INVENTORS.
YASUAKI WATANABE
TADAYASU OHTSU
MASAHIKO NAGANO

BY Louis Bernat.
ATTORNEY

United States Patent Office 3,483,319
Patented Dec. 9, 1969

3,483,319

CIRCUIT FOR SYNCHRONIZING THE ROTARY POSITION OF TRANSDUCER HEADS ON A MAGNETIC TAPE PLAYER

Yasuaki Watanabe, Chigasaki, Tadayasu Ohtsu, Yokohama, and Masahiko Nagano, Tokyo, Japan, assignors to Victor Company of Japan, Limited, Yokohama, Japan Filed Oct. 27, 1966, Ser. No. 590,016
Claims priority, application Japan, Oct. 30, 1965, 40/66,625
Int. Cl. H04n *5/76*
U.S. Cl. 178—6.6 6 Claims

ABSTRACT OF THE DISCLOSURE

The invention provides a synchronizing system for controlling the tracking position of magnetic recording and reproducing transducer heads in a tape player. Cyclically recurring control pulses are recorded on the tape and fed to an AND circuit. Also applied to the AND circuit are position indicating pulses generated responsive to each rotation of a disk carrying the magnetic transducer heads. Thus the AND circuit has an output when the control and position pulses coincide. The disk carrying the heads is rotated responsive to a wave form generated by a free running oscillator which inherently speeds up until it falls into synchronism with drive pulses. Here the drive pulses are the output of the AND circuit.

Figures 1, 2:
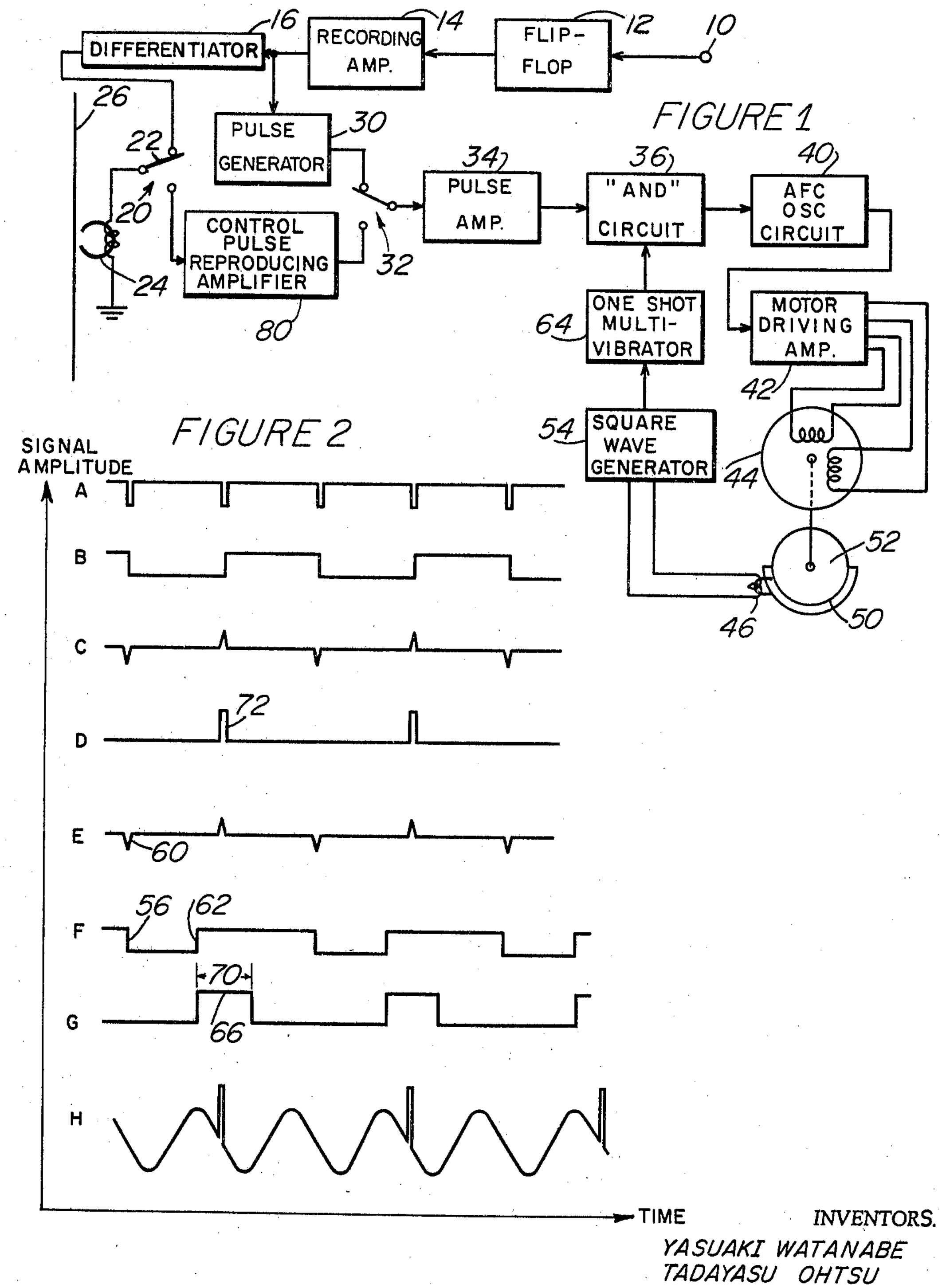

This invention relates to a synchronous motor control system and more particularly to a rotary magnetic transducing head tracking control system for a video tape recorder.

Generally, a video tape recorder having two rotary magnetic heads employs a four pole, synchronous motor for rotating the rotary magnetic heads. Because the four pole motor can synchronize its armature at two positions which are 180 degrees apart, the tracks recorded by one of the two heads may be reproduced by the other to cause a reverse track reproduction. When this occurs, high frequency signal components are lost and the reproduced pictures lose their uniformity and resolution.

In our previous applicaiton Ser. No. 444,245, filed Mar. 31, 1965 and entitled "Synchronous Motor Phase Control System," now U.S. Patent No. 3,423,523, dated Jan. 21, 1969, we described another control system which prevents reverse track reproduction. In that system, a slip ring assembly mounted on the motor drive shaft was used as the feed-back element to provide information on the relative positions of the magnetic transducer heads with respect to the recording tracks on the magnetic tape. Because of the presence of brush noise having variable characteristics in the feedback signal, the tracking control of the magnetic heads becomes erratic; thereby introducing noise in the reproduced picture.

Accordingly, a principal object of this invention is the provision of a stable rotary magnetic transducing head tracking control system which eliminates reverse track reproduction and which does not contain a mechanical slip ring assembly.

This and other objects, features and advantages of the inventilon will become more fully described in the following detailed description of a preferred embodiment in which:

FIGURE 1 is a block diagram showing one embodiment of a system according to this invention; and FIGURE 2 is a series of oscillograms of signals at selected nodes of the system illustrated in FIGURE 1.

Referring to FIGURE 1, a 60 Hz. vertical deflection synchronizing signal from the video signal, such as that shown in oscillogram A of FIGURE 2, is applied to input terminal 10 of frequency dividing flip-flop 12. The flip-flop 12 generates a 30 Hz. square wave, as shown in oscillogram B of FIGURE 2, which is synchronized to the vertical deflection synchronizing signal.

The 30 Hz. square wave signal is transmitted through a recording amplifier 14 to a differentiator circuit 16 where it is differentiated, as shown in oscillogram C of FIGURE 2. The signal appearing at the output of the differentiator 16 is transmitted to switch 20 having a pole 22 connected to a magnetic transducing head 24 for recording and reproducing a control signal on magnetic tape 26.

The output signal from the recording amplifier 14 is also transmitted through a pulse generator 30 which generates positive pulses synchronized in time with the differentiated positive impulses as shown in oscillogram D of FIGURE 2. The pulses are transmitted through switch 32 to a pulse amplifier 34.

The amplified pulses are transmitted through AND circuit 36 to an AFC oscillator circuit 40. The AFC oscillator circuit 40 is a synchronized, sine wave generator which oscillates at the required synchronous frequency when a synchronizing signal is applied to it and at some other frequency, generally higher than synchronous, when no synchronizing signal is supplied. The oscillator's output signal is amplified by amplifier 42. The output terminals of the amplifier 42 are connected to synchronous motor 44 which drives the rotary magnetic transducer heads for the video tape recorder.

The position of the head is indicated by feedback information generated when sensing coil 46 detects the presence of a magnetic material segment 50 mounted on disc 52 which is fixed to the drive shaft of motor 44. The passage of the segment 50 near the coil 46 generates pulses, such as those shown in oscillogram E of FIGURE 2. Thus, these pulses (FIG. 2, E) are synchronized with the transducer head position. These pulses are applied to the input of a square wave generator 54 to provide a train of pulses, as shown in oscillogram F of FIGURE 2. These square pulses have leading edges 56 which are synchronized with the negative pulses 60 and trailing edges 62 which are delayed by a precise interval with respect to the leading edges.

The square wave output signal of circuit 54 is applied to the input of a one-shot multivibrator 64 which generates a single pulse 66 having a pulse width 70. A pulse 66 is generated responsive to each trailing edge 62 of the square waves generated by circuit 54.

The output signal of the multivibrator 64, having a waveform as shown in oscillogram G of FIGURE 2, is applied to the gate input of the AND circuit 36 to open the AND circuit 36 during the interval 70. When the motor 44 is operating at the proper speed and the transducer heads are positioned at the proper rotary angles, pulses 72 from the pulse amplifier 34 will arrive at the input terminal of the AND circuit 36 within the interval 70 when the pulses 66 gate the AND circuit open. The synchronizing signal pulses 72 will pass through the AND circuit and cause the AFC oscillator to generate a sine wave at the synchronous frequency. If the pulses 66 and 70 do not arrive at the AND circuit at the same time, a condition that exists when the motor 44 is operating at the wrong speed or the transducer heads are at the wrong angles, no synchronizing signal is applied to the the AFC oscillator circuit 40 and as a result its frequency increases, thereby causing the heads to rotate at a faster speed until the proper head position is attained. When this occurs, the AND circuit transmits synchronizing signals to the AFC oscillator circuit causing it to oscillate at synchronous frequency. In this embodiment the AFC oscillation circuit 40 oscillates at a frequency of 60 cycles per second which is equal to the frequency of the vertical deflection synchronizing signal. The waveform of the output signal of the AFC oscillator circuit 40 is shown in FIGURE 2 as oscillogram H. The control pulse generated by the AND circuit 36 occurs during the negative slope portion of the sine wave as shown in oscillogram H of FIGURE 2. The width 70 of the square wave 66 generated by the one shot multivibrator 64 which is triggered by the trailing edge 62 of the square wave generated by the square wave generator 54 must be less than three-fourths of a period. The pulse 70 should occur when the synchronizing pulse 72 applied to AFC oscillator circuit 40 has the same phase angle as the negative slope of the sine wave applied to the motor 44. In this embodiment, the center of pulse 70 must be located within one-fourth period of the center of the negative slope of the sine wave to attain optimum stability.

The operation of the system when the video tape recorder is used to reproduce signals will now be described. Switches 22 and 32 are thrown to positions opposite to those shown in FIGURE 1 so that the synchronizing pulses recorded on the tape 26 are reproduced by transducer head 24 and transmitted to the AND circuit 36 through a positive pulse reproducing amplifier 80 and the pulse amplifier 34. The reproducing signal amplifier 80 transmits only positive pulses. The amplified pulses are applied to the AND circuit 36 which, when gated open at the proper time, transmits them to the AFC oscillation circuit 40, as previously described for recording.

When the transducing heads are properly synchronized with the tape 26, synchronizing signals are applied to the AFC oscillator 40 which generates sine waves at the synchronous frequency. If there is a tracking error, the signals do not arrive at the AND circuit in the proper time relationship so that no synchronizing signals are applied to the oscillator 40. This, in turn, causes the motor 44 to increase its speed until the proper tracking relationship is attained.

An embodiment of the rotary magnetic transducing head tracking control system having been described, it will be obvious that many modifications and changes can be made to the illustrated circuit, which modifications and changes are within the scope and spirit of this invention which is defined by the following claims.

What is claimed is:

1. A tracking control system for a rotary magnetic transducer head incorporated in an information storage recorder, said control system comprising:

(a) a synchronous motor having a drive shaft mechanically coupled to rotate the magnetic transducer heads;

(b) a pulse synchronized bistable circuit means having an input terminal for receiving predetermined signals appearing in the information which is to be recorded, said circuit means transmitting output signals which are synchronized with the predetermined signals;

(c) means comprising another magnetic transducing head for recording and reproducing control signals on a track located on the information storage medium;

(d) means for differentiating the output signal and transmitting the differentiated signal to the control signal transducing head while information is being recorded;

(e) means comprising an AND circuit for transmitting a signal in response to the simultaneous appearance of two signals at the AND circuit input terminals;

(f) means for generating other pulses synchronized with the output signals and applying said other pulses to one input of the AND circuit while information is being recorded;

(g) means for generating feed back signals functionally related to the rotary position of the transducer heads and transmitting said feed back signals to the other input terminal of the AND circuit;

(h) means responsive to recorded control signal pulses which are reproduced by the other transducing head for energizing said one input terminal of the AND circuit when information is being reproduced; and (i) means for energizing the motor responsive to alternating current of either one of two frequencies, current of the first frequency being generated responsive to an output signal from the AND circuit and current of the second frequency being generated when there is no output signal from the AND circuit.

2. The tracking control system of claim 1 incorporated in a video tape recorder having a vertical synchronizing signal separator means wherein:

(a) said pulse synchronized bistable circuit means is a bistable flip-flop having an input connected to the output of the vertical synchronizing signal separator means, means for switching the states of the bistable flip-flop responsive to each pulse from the separator means whereby a square wave signal is generated at a frequency equal to one-half of the frequency of the vertical synchronizing pulses from the separator means;

(b) said means for differentiating the output signal including means for differentiating the square wave signal with respect to time and for recording the differentiated signal on the magnetic information storage medium while video information is being recorded;

(c) said means for generating said other pulses being means for generating pulses synchronized with the pulses of only one polarity appearing in the differentiated signal, and for transmitting the generated pulses to one of the AND circuit input terminals while video information is being recorded; and (d) said means responding to recorded control signal pulses being means for transmitting the recorded differentiated signal to one terminal of the AND circuit while video information is being reproduced.

3. The tracking control system of claim 1 wherein the first frequency of the motor energizing means is less than the second frequency.

4. The tracking control system of claim 3 wherein the output of the motor energizing means comprises a sine wave oscillator.

5. The tracking control system of claim 3 wherein the first frequency of the motor energizing means equals the frequency of the other pulses synchronized with the recorded information.

6. The tracking control system of claim 1 wherein the synchronous motor has more than two poles.

References Cited

UNITED STATES PATENTS 3,288,923 11/1966 Arimura et al.
3,327,053 6/1967 Arimura et al.

ROBERT L. GRIFFIN, Primary Examiner

DONALD E. STOUT, Assistant Examiner

U.S. Cl. X.R.

179—100.2; 318—314